United States Patent [19]

Schmid

[11] Patent Number: 4,581,407

[45] Date of Patent: Apr. 8, 1986

[54] STRONG AND ELASTIC POLYURETHANE POLYUREA POLYCRYLATES AND ELECTRON BEAM-CURED COATINGS CONTAINING THE SAME

[75] Inventor: Steven R. Schmid, Buffalo Grove, Ill.

[73] Assignee: DeSoto, Inc., Des Plaines, Ill.

[21] Appl. No.: 703,546

[22] Filed: Feb. 20, 1985

[51] Int. Cl.$^4$ .............................................. C08L 75/02
[52] U.S. Cl. .................................. 524/548; 524/113;
524/360; 524/558; 524/590; 524/751; 524/770;
524/850; 524/871; 528/49
[58] Field of Search ............... 524/548, 113, 360, 558,
524/590, 751, 770, 850, 871; 528/49; 560/25,
26, 115, 158

[56] References Cited

U.S. PATENT DOCUMENTS 4,004,997 1/1977 Tsukamoto et al. ................... 528/49
4,133,723 1/1979 Howard ................................. 528/49

*Primary Examiner*—Maurice J. Welsh
*Attorney, Agent, or Firm*—Dressler, Goldsmith, Shore, Sutker & Milnamow

[57] ABSTRACT

An essentially isocyanate-free polyurethane polyurea polyethylenic oligomer is disclosed which is unusually strong and elastic. This oligomer is the reaction product of: (1) organic diisocyanate; (2) a stoichiometric deficiency of difunctional materials reactive therewith and consisting essentially of: (A) polyoxyalkylene glycol having a molecular weight of from 200 to 1000; (B) dihydric bisphenol-based alkylene oxide adduct containing from 2–10 alkylene groups per molecule; and (C) polyoxyalkylene diprimary amine having a molecular weight of from 150 to 800. In all of these, the alkylene groups contain from 2–4 carbon atoms. Components (A) and (B) are present in a weight ratio of from 1:4 to 9:1 and component (C) is present to supply from 30 to 60 equivalent percent of the total equivalents of component (2). The polyurethane polyurea so-constituted is capped with monohydric ethylenic compound, such as 2-hydroxyethyl acrylate, to provide a molecular weight in the range of about 5,000 to about 30,000.

This polyethylenic oligomer is cured by radiation exposure, such as an electron beam, using from 5% to 25%, based on total polymer solids, of polyethylenic polyhydroxyalkyl melamine in which the alkyl group contains from 2–4 carbon atoms and there are an average of from 2.4 to 3.0 hydroxyalkyl groups per molecule, this polyhydroxyalkyl melamine being preferably acrylated to provide at least 2.4 up to about 3.0 acrylate groups per molecule.

19 Claims, No Drawings

STRONG AND ELASTIC POLYURETHANE POLYUREA POLYCRYLATES AND ELECTRON BEAM-CURED COATINGS CONTAINING THE SAME

DESCRIPTION

1. Technical Field

This invention relates to polyurethane polyurea polyacrylate polymers and to coating compositions containing the same which cure on electron beam exposure to form strong elastic films.

2. Background Art

It is known that polyacrylates, including polyurethane polyacrylates, can be cured using electron beam radiation. However, when the electron beam-cured films have a tensile strength greater than about 5,000 psi., they tend to be brittle and break before they elongate 100% of their initial length. When the electron beam-cured films are sufficiently extensible to avoid breaking until after they stretch 100%, then they tend to be weak and unable to resist tensile forces greater than 5,000 psi. Moreover, when strength and elongation are usefully combined, the cured films will frequently lack high modulus, and it is preferred to provide films having a tensile modulus in excess of 50,000 and a rupture energy in excess of 10,000 inch pounds per cubic inch. It is particularly desired to combine a tensile strength in excess of about 5,000 psi. with an elongation in excess of 200% and a rupture energy in excess of 10,000 inch pounds per cubic inch since this combination is especially effective in providing iron oxide-pigmented coatings for magnetic media.

The properties referred to above are measured on an electron beam-cured unpigmented free film having a thickness of about 1 mil.

DISCLOSURE OF INVENTION

In accordance with this invention, a radiation-curable liquid coating composition is provided which comprises volatile inert organic solvent having dissolved therein a radiation-curable polyurethane polyurea polyethylenic oligomer of special character in combination with from 5% to 25%, based on total polymer solids, of polyethylenic polyhydroxyalkyl melamine in which the alkyl group contains from 2-4 carbon atoms and there are an average of from 2.4 to 3.0 hydroxyalkyl groups per molecule, this polyhydroxyalkyl melamine being reacted with an ethylenic compound to provide at least 2.5 up to about 3.0 ethylenic groups per molecule.

The preferred unsaturated groups are acrylate groups, since these are the most rapidly curable.

The preferred coatings are pigmented, as with magnetizable iron oxide particles, and cured with electron beam radiation. However, conventional photoinitiators, like benzophenone and the like, can be added so ultraviolet radiation can be used for cure, either in clear coatings or in coatings where the pigment content does not unduly absorb the ultraviolet light.

The polyurethane polyurea polyacrylate oligomer which is employed is essentially isocyanate-free and comprises the reaction product of: (1) organic diisocyanate; (2) a stoichiometric deficiency, based on said diisocyanate, of difunctional materials reactive with isocyanate functionality. This component (2) consists essentially of: (A) polyoxyalkylene glycol in which the alkylene group contains from 2-4 carbon atoms and having a molecular weight of from 200 to 1000; (B) dihydric bisphenol-based alkylene oxide adduct in which the alkylene group contains from 2-4 carbon atoms and containing from 2-10 alkylene groups per molecule; and (C) polyoxyalkylene diamine having a molecular weight of from 150 to 800 and in which the alkylene groups contain from 2-4 carbon atoms, said components (A) and (B) being present in a weight ratio of from 1:4 to 9:1 and said component (C) being present in an amount of from 30 equivalent percent to 60 equivalent percent of the total equivalents of component (2), the polyurethane polyurea of components (1) and (2) being capped by (3) a monohydric ethylenic compound, preferably an hydroxyalkyl acrylate in which the alkyl group contains from 2-4 carbon atoms, and the proportion of the ethylenic compound providing an ethylenically unsaturated oligomer having a molecular weight in the range of about 5,000 to about 30,000.

The term "polyacrylate" denotes a plurality of acrylic acid groups, and this is one accepted use of this term. Also, the term "oligomer" is a common one, and denotes relatively low molecular weight polymers having a small number of units, e.g., from about 2 to about 20.

Referring more particularly to the essentially isocyanate-free polyurethane polyurea polyethylenic oligomer used herein, this oligomer is preferably based on an aliphatic diisocyanate to provide the desired elasticity. Aromatic diisocyanates, like toluene diisocyanate and diphenyl methane diisocyanate, produce oligomers which are less flexible, but may still be used herein, especially in admixture with aliphatic diisocyanates. The preferred aliphatic diisocyanates are known and are preferably illustrated herein by 4,4'-methylene-bis(cyclohexylisocyanate) which is available in commerce from Mobay under the trade designation Desmodur W. Other useful diisocyanates are diisocyanate derivatives of saturated aliphatic or cycloaliphatic compounds containing from 2-12, preferably 2-6 carbon atoms, such as isophorone diisocyanate. 2,2,4-trimethyl-hexamethylene diisocyanate will further illustrate the class of useful diisocyanates.

The organic diisocyanate is combined with a stoichiometric deficiency, based on the diisocyanate, of difunctional materials reactive with isocyanate functionality. This deficiency leaves room for capping with a monohydric ethylenic compound, preferably an acrylate, so the deficiency used and the proportion of monohydric ethylenic compound, determines the molecular weight which will be obtained using components of any given molecular weight. Molecular weight is important to this invention and will be discussed hereinafter.

The difunctional materials reactive with isocyanate functionality must be of three different types and consist essentially of: (A) polyoxyalkylene glycol in which the alkylene group contains from 2-4 carbon atoms, 4 carbon atoms being preferred, and having a molecular weight of from 200 to 1000, preferably 300 to 800; (B) dihydric bisphenol-based alkylene oxide adduct in which the alkylene group contains from 2-4 carbon atoms, 2 or 3 being preferred, and containing from 2-10 alkylene groups per molecule, preferably from 2-6 such groups; and (C) polyoxyalkylene diprimary amine having a molecular weight of from 150 to 800, preferably from 175 to 400, and in which the alkylene groups contain from 2-4 carbon atoms, preferably 3 carbon atoms. The components (A) and (B) are present in a weight ratio of from 1:4 to 9:1, the larger proportions of component (A) being useful at the preferred polymer molecular weights. Lastly, the component (C) is present in an amount of from 30 equivalent percent to 60 equivalent percent of the total equivalents of component (2).

It is stressed that the diprimary amine provides toughness and strength in the combination, but it must be used in combination with the two different dihydric alcohols. When the polyoxyalkylene glycol component is used alone, the tendency is to provide cured products which lack strength and which are even more deficient in tensile modulus. On the other hand, when the dihydric bisphenol adduct is used alone, the cured products are quite brittle. It is only when the two different didhydric materials are combined in the combination of this invention, that high strength, high elongation and high modulus can be simultaneously achieved.

The useful polyoxyalkylene glycols are illustrated by polyethylene glycols, polypropylene glycols, and polytetramethylene glycols. Any of these having a molecular weight of from 200 to 1000 can be used. It is preferred to use a polytetramethylene glycol having a molecular weight of about 650 which is available from Du Pont (Wilmington, Del.) under the trade designation "Teracol 650". Other higher molecular weight products of the same character are available under the tradenames "Teracol-1000" and "Teracol-2000". The number in these tradenames indicates the approximate molecular weight of the polytetramethylene glycol.

It should be noted that identification of the molecular weight of the reactive materials is obtained by assuming the difunctional structure and calculating the molecular weight from the measured reactive functionality. This definition of molecular weight is employed unless otherwise stated.

The dihydric bisphenol-based alkylene oxide adduct is illustrated by alkylene oxide adducts of bisphenol A, which is the preferred bisphenol because of the 4,4' positioning of its two OH groups. The adduction reaction is itself conventional, and one can adduct on ethylene oxide, propylene oxide or butylene oxide, depending upon the availability of pressure equipment to handle the ethylene oxide. The ethylene oxide adduct of bisphenol A containing about 4 moles of adducted ethylene oxide per mole of the bisphenol is now preferred, but the corresponding propylene oxide adduct is also quite good. The product supplied by Akzo Chemie America under the trade designation Dianol 2210 is useful, as is the companion product Dianol 33, the latter providing products which are somewhat stronger than the former.

The previously described components A and B are preferably used in a weight ratio of from 1:2 to 2:1, since this provides the best balance of properties.

The polyoxyalkylene diprimary amines preferably have a molecular weight of from 175 to 400, and are illustrated by a polyoxypropylene diamine having a molecular weight of about 230. These react with isocyanate functionality to provide urea groups which add to the strength of the oligomer in the cured films of this invention. These diamines provide a portion of component 2 of the oligomers used herein, and preferably provide from 35 equivalent percent to 55 equivalent percent of the total equivalents of component (2).

The monohydric ethylenic compounds which are preferably acrylates are more preferably adducts of an alkylene oxide with acrylic acid. 2-hydroxyethyl acrylate is preferred and is used herein as illustrative, though the corresponding products made with propylene oxide or butylene oxide are also fully useful, as is monohydric dicaprolactone monoacrylate which is the reaction product of 2-hydroxyethyl acrylate with epsilon caprolactone which formes a dimer under the reaction conditions. The caprolactone monoacrylate can be obtained from Union Carbide Corporation under the trade designation Tone M 100. Monohydric polyacrylates are also useful, such as pentaerythritol triacrylate and its monohydric dimer. These acrylates can be replaced by the corresponding methacrylates and itaconates, though this is less preferred.

The monohydric ethylenic compound provides terminal ethylenic unsaturation for cure, and also serves as a monofunctional chain terminator. As a result, the larger the proportion of monohydric unsaturated compound, the lower the molecular weight of the polymeric product, having due regard for the molecular weight of the individual components of the polyurethane polyurea. These factors are adjusted to provide an essentially isocyanate-free polyethylenic oligomer having a molecular weight (number average) within the previously defined range. While one can broadly use anything from 5,000 to about 30,000 (which is the upper limit of production capacity), the lower molecular weights of from 6,000 to 15,000 provide the best combination properties on curing.

While freedom from isocyanate should limit this functionality to not more than a trace in the final product, the products which have been produced herein have contained no detectable isocyanate functionality, and this is preferred practice.

The reaction with the isocyanate groups is entirely conventional being usually carried out at moderate temperature in the presence of a catalyst which promotes the urethane-forming reaction, such as dibutyl tin dilaurate. It is customary to limit the temperature to about 60° C., and this can be done by slowing the rate of addition of one of the components, such as the diamine component which is more highly reactive than the hydroxy components. The order of reaction is largely immaterial, it being possible to bring in the monohydric ethylenic compound either at the beginning, during the middle of the procedure, or as the last reactant. All of these variations are known in the art. It is usual herein to employ the diisocyanate and the materials reactive therewith in stoichiometric amounts and to continue the reaction until the isocyanate functionality is substantially undetectable. As will be understood, these reactions are conveniently carried out in solvent solution, this being illustrated using the preferred tetrahydrofuran to maintain the liquid condition as the reaction proceeds to progressively increase the molecular weight in the reactor.

The cross-linking agent is important to this invention, albeit one needs both a proper cross-linking agent and also a proper polyethylenic oligomer to be cured. Using the most preferred ethylenically unsaturated cross-linking agent as illustrative, these are polyacrylates. Many polyacrylate cross-linking agents are available, such as trimethylol propane triacrylate or pentaerythritol triacrylate, and these are available with the same acrylate functionality used herein. However, these polyacrylates lead to relatively inextensible cured products and do not provide the combination of properties which this invention seeks and which are so unusual.

The cross-linking agents used herein are ethylenically unsaturated polyhydroxyalkyl melamine in which the alkyl group contains from 2–4 carbon atoms. These are formed by the adduction of an alkylene oxide, such as ethylene oxide, propylene oxide or butylene oxide with melamine to form an average of from 2.4 to 3.0 hydroxyalkyl groups per molecule. The preferred hydroxyalkyl groups are hydroxypropyl groups, and these are illustrated herein by a polyhydroxypropyl melamine containing about 3.0 terminal hydroxypropyl groups per molecule. Such a polyhydroxypropyl melamine is available in commerce from American Cyanamid Company, Wayne, N.J., under the trade designation Melpol 125. This product, has a molecular weight of about 275. It is desired to place at least 2.4 unsaturated groups of this polyhydroxypropyl melamine base structure, and this can be done by esterification with acrylic acid, or preferably, by prereacting a monohydric acrylate of the type described previously, preferably 2-hydroxyethyl acrylate, with one molar proportion of an organic diisocyanate, such as isophorone diisocyanate, or toluene diisocyanate, to form a monoisocyanate monoacrylate. This monoisocyanate monoacrylate is reactive with both amino hydrogen atoms and hydroxy groups, so it reacts easily with the polyhydroxypropyl melamine. In this way, one can obtain an adduct having up to about 3.0 moles of acrylate functionality per mole of melamine. The resulting product is a solid at room temperature, it has a molecular weight (by calculation) of about 1290, and is used in solution. In the examples hereinafter, it will be used in methyl ethyl ketone solution at 65% solids.

The methacrylates corresponding to those referred to above are also useful. A commercially available isocyanate-functional methacrylate is isocyanatoethyl methacrylate.

The coating composition which are particularly contemplated contain magnetizable particles (treated or untreated iron oxide) dispersed in a liquid vehicle comprising the polymer solids described herein which contain inert volatile organic solvents to provide the needed liquidity. Typical solvents include aromatic solvents, like toluene, cycloaliphatic solvents, such as cyclohexanone, and heterocyclic solvents, such as tetrahydrofuran. The last named is preferred, as will be exemplified.

Based on 100 parts of nonvolatile polymer solids, which includes the polyethylenic oligomer and the polyethylenic polyhydroxyalkyl melamine, it is preferred to employ from 50 to 500 parts of inert volatile solvent, preferably from 100 to 400 parts. These solvents are removed, preferably by vaporization at room or slightly elevated temperature, prior to electron beam curing. The films from which the solvents have been removed are normally solid tack-free films which are hardened and rendered solvent resistant by the electron beam exposure.

This liquid coating composition is preferably pigmented with magnetizable particles and applied as a wet solvent-containing film on a nonmagnetizable substrate, such as polyethylene terephthalate film, and the film is exposed to curing radiation after the solvent has been largely removed, as evidenced by the solid film usually formed.

Pigmentation with magnetizable particles in this invention will normally provide coating compositions having from 50% to 85% by weight of pigment particles based on the total weight of the cured coating. These pigmented compositions will desirably contain from 25% to 50% of total nonvolatile solids, balance volatile organic solvent.

Magnetizable particles and electron beam curing are preferred. However, one may use pigments to merely provide opacity or coloration, and in some instances ultraviolet curing may be used.

In this application, all proportions are by weight, unless otherwise stated, and the invention is illustrated in the examples which follow.

EXAMPLE

There is placed in a reaction vessel, 8.64 moles of 4,4'-methylene-bis(cyclohexylisocyanate) [Desmodur W may be used], 2.16 moles of polytetramethylene glycol of molecular weight 650 (du Pont product Teracol 650 may be used) 2.16 moles of 1,1'-isopropylidene bis(p-phenyleneoxy-2-ethoxy ethanol (Akzo Chemie America product Dianol 2210 may be used), 5000 grams of tetrahydrofuran and 4.6 gram of dibutyl tin dilaurate. This mixture is stirred and allowed to exotherm to 60° C. After one hour at this temperature, 0.40 mole of 2-hydroxyethyl acrylate and 2.3 gram of phenothiazine are added and the mixture is held at 35° C. to 40° C. with stirring for an additional ½ hour. Then 3360 grams of a tetrahydrofuran solution containing 4.12 moles of polyoxypropylene diamime having a molecular weight of 230 and two primary amine groups (Texaco product Jeffamine D230 may be used) is added slowly to maintain a reaction temperature of 60° C. This reaction is continued until free NCO could no longer be detected, and then 5313 grams of tetrahydrofuran is added to yield a 30% solvent solution having a viscosity of 6000 centipoises. The polymeric product was found to have a number average molecular weight of about 26,000.

There is mixed with the solvent solution obtained above enough triacrylated polyhydroxypropyl melamine containing about 3.0 terminal hydroxypropyl groups per molecule (Melpol 125 may be triacrylated and used in 65% solution in methyl ethyl ketone) to provide 10% of triacrylated melamine-based cross-linking agent based on the total weight of the polyacrylate oligomer and cross-linking agent.

The solvent solution coating composition produced as above described has a solids content of about 31% and it is applied as a coating on Mylar film using a Bird applicator which applies a wet coating about 3 mils thick. The coated Mylar is dried in air for 2 hours to provide a tack-free solid film having a thickness of about 1 mil. Exposure to an electron beam applying a 10 megarad dose of radiation provides a cured film having a tensile strength of 5900 psi., an elongation of 230%, a tensile modulus of 150,000 psi., and a rupture energy of 17,910 inch pounds per cubic inch. These are remarkable properties.

The cured films are cut off the Mylar substrate in order that these properties might be measured on the unpigmented free film.

Repeating the above example, but using Dianol 2210 or Dianol 33 alone instead of an equimolar mixture with Teracol 650, the Dianol being used in the same equivalent proportion as the mixture which it replaces, the cured products were too brittle to measure, and the elongation was negligible at a molecular weight of 8,000. At a molecular weight of 26,000, the elongation was better, but did not exceed 25%. Using Teracol 650 alone instead of the Dianol compound alone, at 26,000 molecular weight, the cured film was too soft to measure its strength, and at a molecular weight of 8,000, the properties were not too bad, but the modulus was only 4560 psi. instead of well over 100,000, and the rupture energy was only 5163, instead of being over 10,000.

In general, it is found that as the molecular weight is reduced from 26,000 to 8,000 in this invention, the rupture energy increases and the tensile strength increases. At the same time, the elongation also increases, so the lower molecular weight polymers are surprising from this further standpoint.

What is claimed is:

1. An essentially isocyanate-free radiation-curable polyurethane polyurea polyethylenic oligomer comprising the reaction product of: (1) organic diisocyanate; (2) a stoichiometric deficiency, based on said diisocyanate, of difunctional materials reactive with isocyanate functionality and consisting essentially of: (A) polyoxyalkylene glycol in which the alkylene group contains from 2-4 carbon atoms and having a molecular weight of from 200 to 1000; (B) dihydric bisphenol-based alkylene oxide adduct in which the alkylene group contains from 2-4 carbon atoms and containing from 2-10 alkylene groups per molecule; and (C) polyoxyalkylene diprimary amine having a molecular weight of from 150 to 800 and in which the alkylene groups contain from 2-4 carbon atoms, said components (A) and (B) being present in a weight ratio of from 1:4 to 9:1 and said component (C) being present in an amount of from 30 equivalent percent to 60 equivalent percent of the total equivalents of component (2), the polyurethane polyurea of components (1) and (2) being capped by (3) a monohydric ethylenically unsaturated compound and the proportion of said monohydric ethylenically unsaturated compound providing a polyethylenically unsaturated oligomer having a molecular weight in the range of about 5,000 to about 30,000.

2. An oligomer as recited in claim 1 in which the ethylenic unsaturations are acrylate unsaturation.

3. An oligomer as recited in claim 1 in which said diisocyanate is an aliphatic diisocyanate.

4. An oligomer as recited in claim 3 in which said diisocyanate is 4,4'-methylene-bis(cyclohexylisocyanate).

5. An oligomer as recited in claim 1 in which said polyoxyalkylene glycol is a polytetramethylene glycol having a molecular weight of from 300 to 800.

6. An oligomer as recited in claim 5 in which said polytetramethylene glycol has a molecular weight of about 650.

7. An oligomer as recited in claim 1 in which said dihydric bisphenol-based alkylene oxide adduct is an ethylene oxide or propylene oxide adduct of bisphenol A containing from 2-6 alkylene groups per molecule.

8. An oligomer as recited in claim 1 in which said polyoxyalkylene diprimary amine is a polyoxypropylene diamine having a molecular weight of from 175 to 400.

9. An oligomer as recited in claim 1 in which said components (A) and (B) are present in a weight ratio of from 1:2 to 2:1.

10. An oligomer as recited in claim 9 in which said component (C) is present in an amount of from 35 equivalent percent to 55 equivalent percent of the total equivalents of component (2).

11. An oligomer as recited in claim 9 in which said oligomer is capped with an hydroxyalkyl acrylate in which the alkyl group contains from 2-4 carbon atoms.

12. An oligomer as recited in claim 11 in which said oligomer is capped with 2-hydroxyethyl acrylate.

13. An oligomer as recited in claim 9 in which said oligomer has a molecular weight in the range of about 6,000 to about 15,000.

14. A radiation-curable liquid coating composition comprising volatile inert organic solvent having dissolved therein the polyurethane polyurea polyethylenic oligomer of claim 1 and from 5% to 25%, based on total polymer solids, of polyethylenic polyhydroxyalkyl melamine in which the alkyl group contains from 2-4 carbon atoms and there are an average of from 2.4 to 3.0 hydroxyalkyl groups per molecule, said polyhydroxyalkyl melamine containing at least 2.4 up to about 3.0 unsaturated groups per molecule.

15. A coating composition as recited in claim 14 in which said unsaturated groups are acrylate groups.

16. A coating composition as recited in claim 15 in which said polyhydroxyalkyl melamine is propoxylated and acrylated to provide about 3.0 acrylate groups per molecule.

17. A coating composition as recited in claim 14 in which said composition is pigmented.

18. A coating composition as recited in claim 17 in which said pigment particles are magnetizable particles in an amount of from 50% to 85% by weight based on the total weight of the cured coating, and said composition contains from 50 to 500 parts of inert volatile solvent per 100 parts of total polymer solids.

19. A coating composition as recited in claim 17 in which said composition contains from 25% to 50% of total nonvolatile solids, balance volatile organic solvent.

* * * * *